US006294737B1

(12) United States Patent
Chestney

(10) Patent No.: US 6,294,737 B1
(45) Date of Patent: Sep. 25, 2001

(54) REUSABLE CLOSURE FOR WIRE SPLICES

(76) Inventor: P. L. Chestney, 3413 Clay St., Denver, CO (US) 80211

( * ) Notice: Subject to any disclaimer, the term of this patent is extended or adjusted under 35 U.S.C. 154(b) by 0 days.

(21) Appl. No.: 09/338,674

(22) Filed: Jun. 23, 1999

(51) Int. Cl.[7] .......... H02G 5/02

(52) U.S. Cl. .......... 174/74 R; 174/84 R; 174/74 A

(58) Field of Search .......... 174/74 R, 84 R, 174/92, 59, 82, 74 A

(56) References Cited

U.S. PATENT DOCUMENTS

| | | | | |
|---|---|---|---|---|
| 3,325,591 | * | 6/1967 | Wahl | 174/138 |
| 3,992,567 | | 11/1976 | Malia | 174/73 |
| 3,992,568 | | 11/1976 | Rene Al | 174/84 S |
| 3,992,569 | | 11/1976 | Hankins | 174/92 |
| 4,029,896 | * | 6/1977 | Skinner | 174/138 R |
| 4,070,543 | | 1/1978 | Thompson | 174/87 |
| 4,135,587 | | 1/1979 | Diaz | 174/92 |
| 4,292,099 | | 9/1981 | Dinger | 156/49 |
| 4,512,828 | | 4/1985 | Helm | 156/49 |
| 4,570,032 | | 2/1986 | Charlebois | 174/84 |
| 4,581,480 | | 4/1986 | Charlebois | 174/84 |
| 4,721,830 | * | 1/1988 | Dagan et al. | 174/41 |
| 4,721,832 | | 1/1988 | Toy | 174/87 |
| 4,764,232 | | 8/1988 | Hunter | 156/48 |
| 4,795,857 | * | 1/1989 | McInnis | 174/138 F |
| 4,818,310 | | 4/1989 | McNeal | 156/48 |
| 4,822,434 | | 4/1989 | Sawaki | 156/48 |
| 4,849,580 | | 7/1989 | Reuter | 174/92 |
| 4,875,952 | | 10/1989 | Mullin | 156/48 |
| 4,933,512 | | 6/1990 | Nimiya | 174/92 |
| 4,985,598 | | 1/1991 | Bubica | 174/93 |
| 5,021,610 | | 6/1991 | Roberts | 174/65 |
| 5,021,611 | | 6/1991 | Amano | 174/88 |
| 5,021,612 | | 6/1991 | Joffe | 174/146 |
| 5,047,594 | | 9/1991 | Powell et al. | 174/88 |
| 5,055,636 | | 10/1991 | Jaycox | 174/87 |
| 5,099,088 | | 3/1992 | Kanagawa | 174/76 |
| 5,251,373 | | 10/1993 | DeCarlo et al. | 29/870 |
| 5,358,588 | | 10/1994 | Tahara | 156/49 |
| 5,371,323 | * | 12/1994 | Schneider et al. | 174/92 |
| 5,403,977 | | 4/1995 | Swindon | 174/77 |
| 5,509,202 | | 4/1996 | Abdow | 29/871 |
| 5,537,742 | | 7/1996 | Le et al. | 29/869 |
| 5,569,882 | * | 10/1996 | Yokoyama et al. | 174/76 |
| 5,594,212 | * | 1/1997 | Nourry et al. | 174/88 R |
| 5,610,370 | * | 3/1997 | Fremgen et al. | 174/91 |
| 5,691,508 | * | 11/1997 | Radliff et al. | 174/92 |

* cited by examiner

*Primary Examiner*—Dean A. Reichard
*Assistant Examiner*—William H. Mayo, III
(74) *Attorney, Agent, or Firm*—Kyle W. Rost

(57) ABSTRACT

A two piece housing for a spliced portion of multi-conductor copper core electric cable includes housings adapted for two, three, or four wire cable. A bottom mated structure (31) and a top mated structure (30) are predetermined to accept screws (15) for clamping the two structures together. The housing interior surface (28) includes mortised frusto-conical shaped openings (23) with grooves (26) at right angles and contiguous to the cable passage (24) for accepting and locking wire nuts (12) over wire splices (6). Opposing jaws (17),(18), and (19), adjacent to the point of cable entry/exit (25) inside the cable passage (24) engage a two, three, or four wire cable (20),(8),(22). The opposed jaw configuration includes a curved, wedge shaped inner lip (27); a wedge shaped flange (13); and a curved overlapping lip (14).

13 Claims, 4 Drawing Sheets

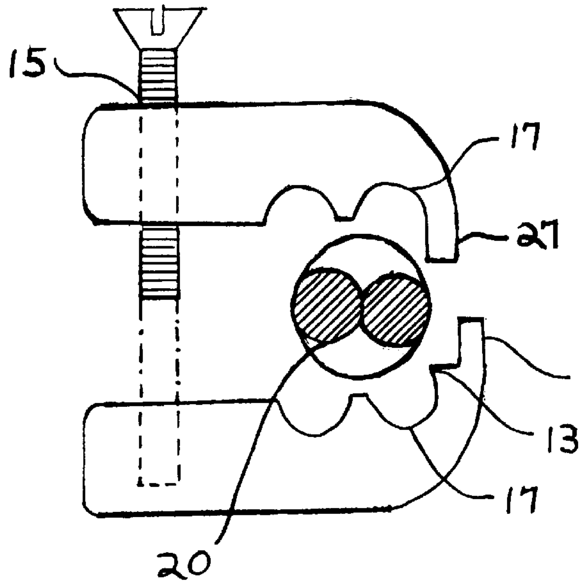
FIG. 4A
FIG. 4B
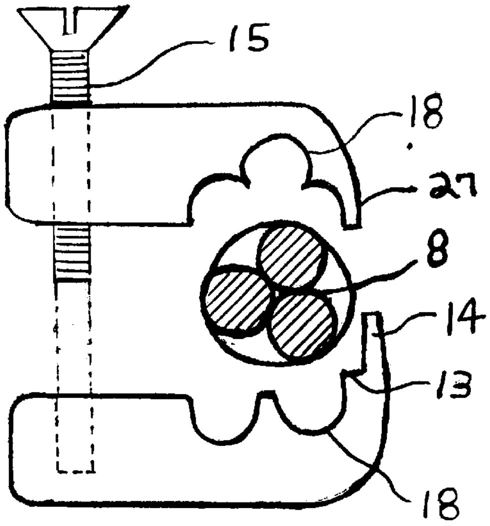
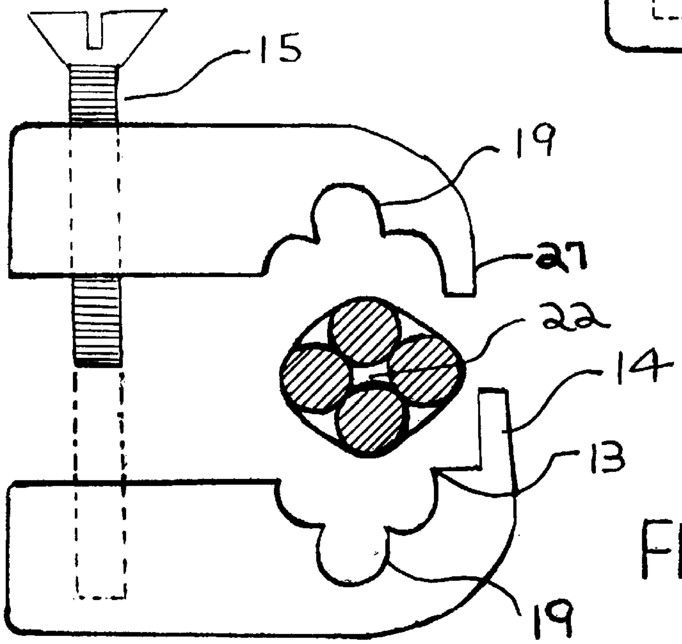
FIG. 4C

REUSABLE CLOSURE FOR WIRE SPLICES

CROSS-REFERENCES TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

The present invention relates generally to reconnecting, enclosing, clamping, and locking wire splices from a multi-wire electric cable into an enclosure housing and more specifically to a reusable, improved enclosure for wire splices.

2. Description of the Related Art Including Information Disclosed Under 37 CFR 1.97 and 1.98

Previous methods of wire splicing require multiple pieces for clamping a cable in a bushing and for attaching the bushing to a housing. If a liquid tight seal was required, a sealing material was added to a cavity in the bushing after the cables were installed, or a portion of the bushing was hermetically sealed to the cable.

BRIEF SUMMARY OF THE INVENTION (a) The main object of the present invention is to provide a reusable protective enclosure for a spliced electric cable, which enclosure may be reopened for an additional splice, or reused with another cable;

(b) to provide an enclosure that eliminates the labor intensity of heretofore known protection for wire splices;

(c) to eliminate some plurality of parts;

(d) to provide a molded rigid support, for wire splices, made with a non-conductive plastic;

(e) to provide a less costly than heretofore known wire splice protecting device, but equally effective.

The invention is a reusable enclosure for reconnecting, clamping, locking, and enclosing wire splices. The enclosure is formed of a two piece housing having an interior surface and an exterior surface, screws clamping together the two pieces of the housing, and a cable passage defined between the two pieces of the housing. The housing defines mortised frusto-conical shaped openings with grooves for locking frusto-conical wire nuts into the housing, and a predetermined opposed jaw configuration for enclosing the cable at the point of entry/exit into the cable passage.

Further objects and advantages of the invention will become apparent from a consideration of the drawings and ensuing descriptions.

BRIEF DESCRIPTION OF THE SEVERAL VIEWS OF THE DRAWINGS

In the drawings, closely related figures have the same number but different alphabetic suffixes.

FIGS. 4A to 4C show an end view of predetermined opposed jaw configurations of a enclosure housing for a two, three, and four wire cable, respectively.

DETAILED DESCRIPTION OF THE INVENTION

Figure 1:
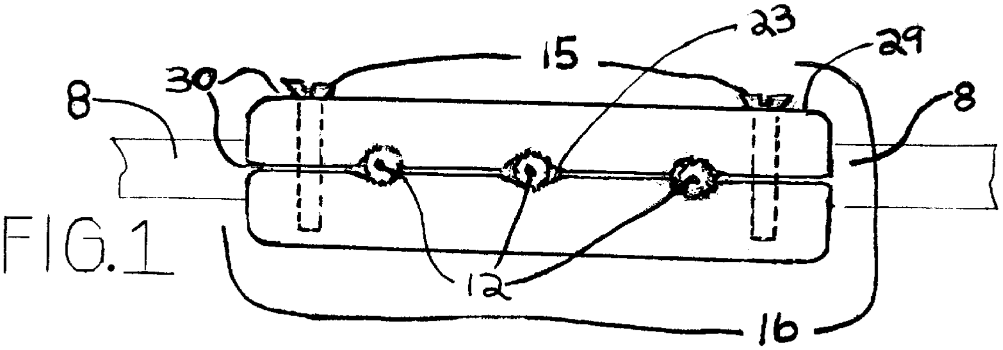
FIG. 1 is a fully assembled three wire splice enclosure housing.

The following reference numerals are used throughout the drawings and specification:

6 copper core wire splice
8 three wire cable, showing outer cover
9 green wire with cover
10 white wire with cover
11 black wire with cover
12 wire nut
13 wedge shaped flange
14 curved overlapping lip
15 screw
16 three wire housing
17 two wire voids in two wire jaw configuration
18 three wire voids in three wire jaw configuration
19 four wire voids in four wire jaw configuration
20 two wire cable
22 four wire cable
23 mortised frusto-conical shaped wire nut reception recess
24 cable passage
25 entry/exit point of cable
26 wire nut reception recess with wire nut grooves
27 curved wedge shaped inner lip
28 interior surface
29 exterior surface
30 top mated structure
31 bottom mated structure
32 rounded corners
33 two wire housing
34 four wire housing FIG. 1 is a fully assembled three wire splice enclosure housing 16 on a three wire cable 8 showing the wire nut openings 23, wire nuts 12 (prior art), and screws 15 on an exterior surface 29 of the top mated structure 30.

Figure 2:
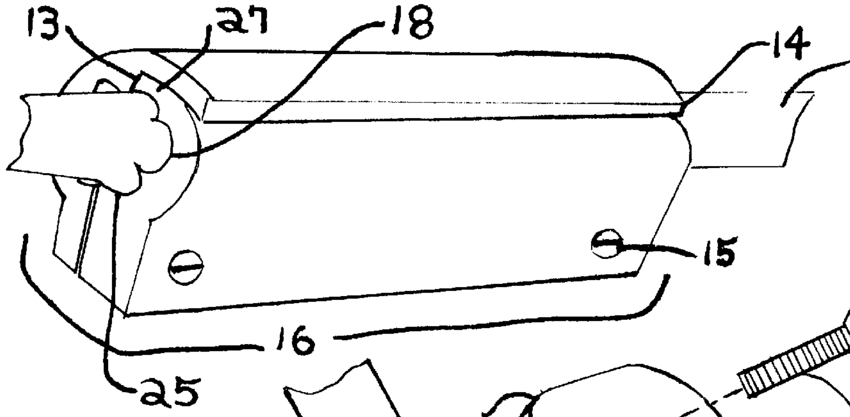
FIG. 2 is a perspective view of a fully assembled enclosure housing.

FIG. 2 is a perspective view of a fully assembled three wire enclosure housing 16 for wire splices on a three wire cable 8, showing a predetermined three wire opposed jaw configuration 18. The curved wedge shaped inner lip 27 opposes the wedge shaped flange 13 while being overlapped and held together as a hinge mechanism by the curved overlapping lip 14, in a closed position with the cable tightly enclosed at the point of cable entry/exit 25 by a three wire predetermined opposed jaw configuration 18.

Figure 3A:
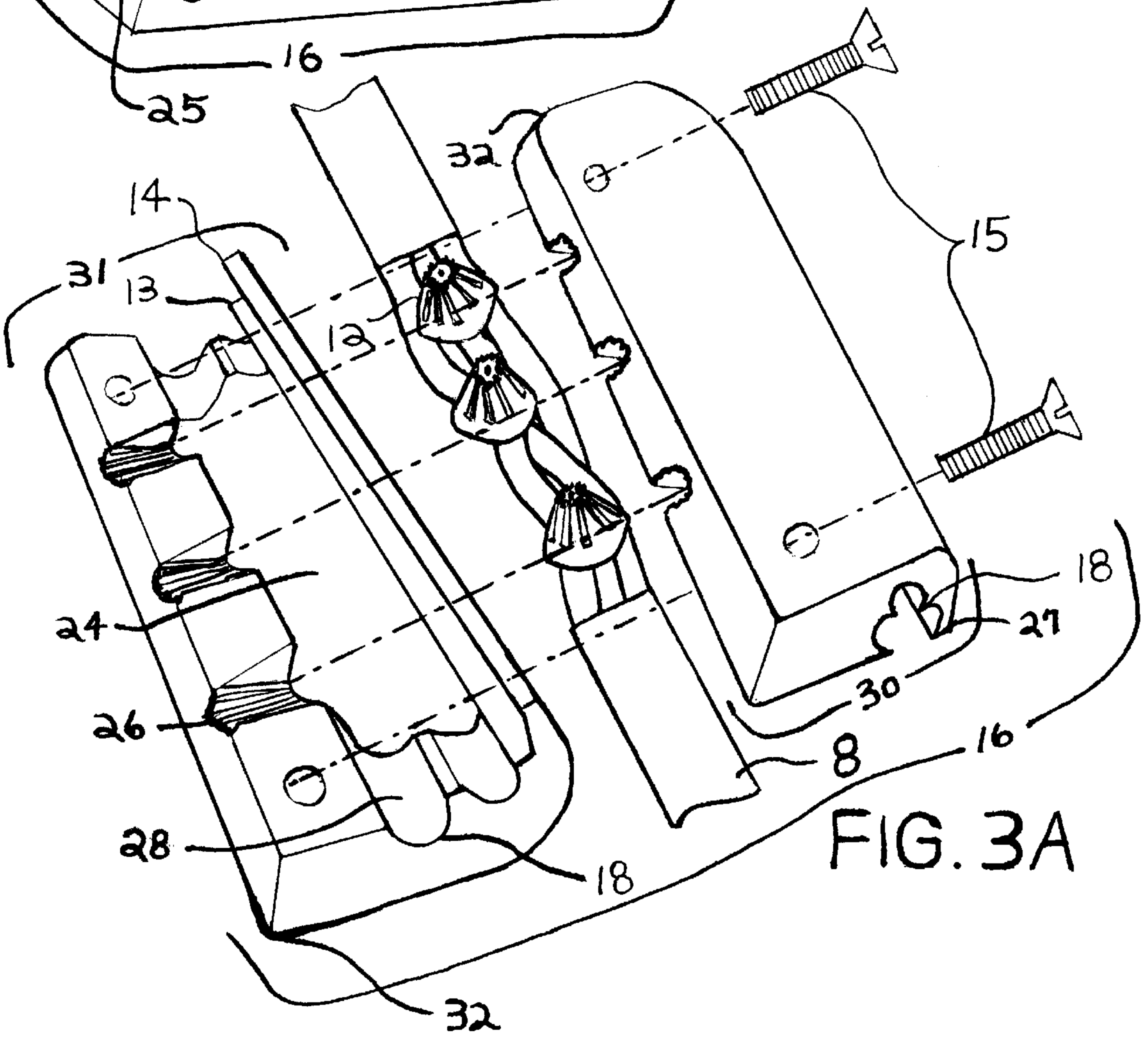
FIG. 3A is an exploded perspective view of a three wire, two piece enclosure housing.

FIG. 3A is an exploded perspective view of a three wire, two piece enclosure housing 16; a three wire cable 8 spliced and covered with wire nuts 12; a three wire jaw configuration 18; a curved, wedge shaped inner lip 27; a wedge shaped flange 13; and a curved overlapping lip 14 on the interior surface 28 of the bottom mated structure 31.

The grooves 26 for locking the frusto-conical wire nuts 12 securely in the mortised frusto-conical shaped wire nut reception recesses 23 of the top and bottom mated structures 30, 31, respectively, are visible in the bottom mated structure 31. The relationship of the wire nut reception recesses 23 to the cable passage 24 is shown in FIG. 3A. Each recess 23 is elongated along an axis extending transversely or perpendicularly with respect to the longitudinal dimension of the passage 24 and is offset to a side of the passage.

The three wire voids in a three wire jaw configuration 18 located at each end of the cable passage 24 are visible in both top and bottom mated structures 30, 31, respectively. The rounded corners 32 for preventing drag are visible in top and bottom mated structures 30, 31, respectively, (SEE FIG. 3A).

Figure 3B:
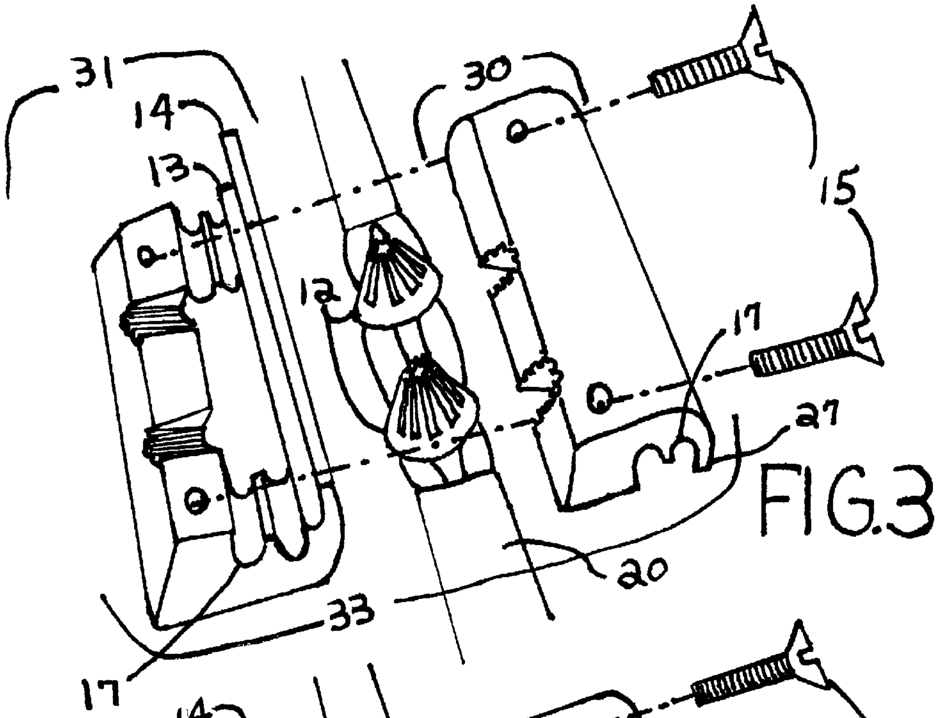
FIG. 3B is an exploded perspective view of a two wire, two piece enclosure housing.

FIG. 3B is an exploded perspective view of a two wire enclosure housing 33; a two wire cable 20, spliced and covered with wire nuts 12 (prior art); a two wire jaw configuration with voids defined by arcs 17 intersecting each other at cusps; a curved wedge shaped inner lip 27; a wedge shaped flange to oppose it 13; and a curved overlapping lip 14 to complete a hinge mechanism. Top and bottom mated structures 30, 31, respectively, are completely separate but molded to slot together as a single unit when sandwiching a two wire cable 20.

Figure 3C:
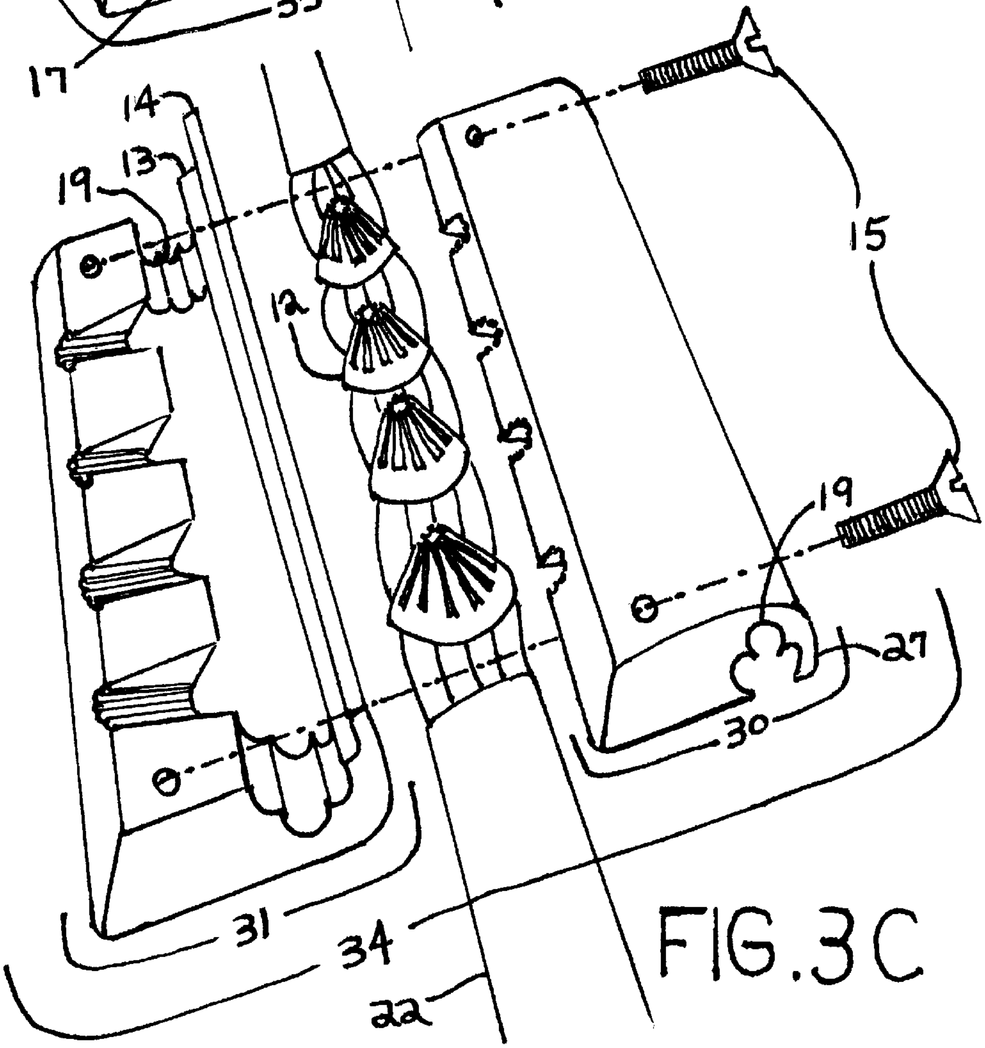
FIG. 3C shows an exploded perspective view of a four wire, two piece enclosure housing.

FIG. 3C is an exploded perspective view of a four wire enclosure housing 34; a four wire cable 22, spliced and covered with frusto-conical wire nuts 12 (prior art); a four wire jaw configuration with voids defined by arcs 19 intersecting each other to form cusps; a curved wedge shaped inner lip 27; a wedge shaped flange 13 to oppose it; and a curved overlapping lip 14 to complete the hinge mechanism; and screws 15 to clamp the top and bottom mated structures 30, 31, tightly together, sandwiching the cable 22 and providing a generally tamper-resistant seal.

FIGS. 4A to 4C show the end view of predetermined opposed jaw configurations with voids of a two, three, and four wire configuration 17, 18, 19, respectively. In each view, a curved wedge shaped inner lip 27, a wedge shaped flange 13 to oppose it, and a curved overlapping lip 14 completes a hinge mechanism. Screws 15 that clamp the top and bottom mated structures 30, 31 together surrounding the cable are visible, along with a two, three, and four wire cable, 20, 8, and 22, respectively.

Figure 5A:
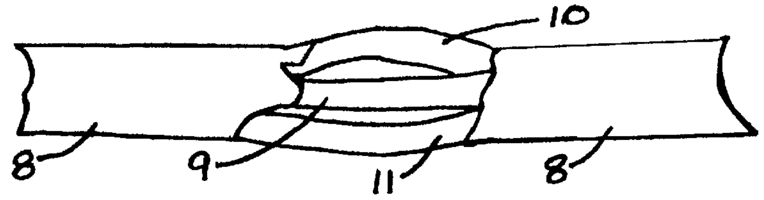
FIGS. 5A to 5C show the cable preparation necessary to use the three wire enclosure housing.
Figure 5B:
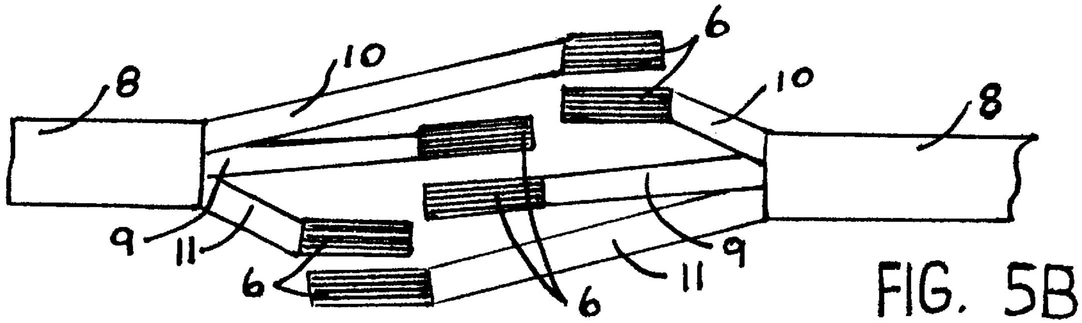
Figure 5C:
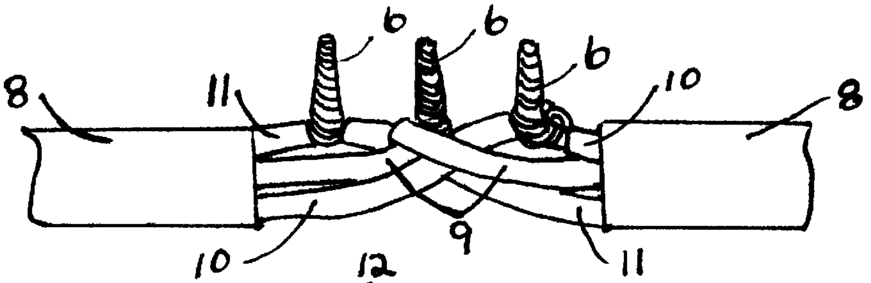

FIGS. 5A to 5C show the cable preparation necessary to use the three wire enclosure housing. The three wire cable 8 (See FIG. 5A) is prepared to be spliced by cutting the outer cable 8 away and exposing the internal wires (See FIG. 5B) approximately three inches. FIG. 5C shows how the short, medium, and long cuts on the internal wires 9, 10, and 11—green, white, and black wire, respectively—oppose each other and are twisted together in a splice 6 to space neatly in a row inside a three wire enclosure 16 (See FIG. 3A), and fit into the mortised frusto-conical shaped openings 23 with grooves 26 that lock the wire nuts 12 (prior art).

Figure 5D:
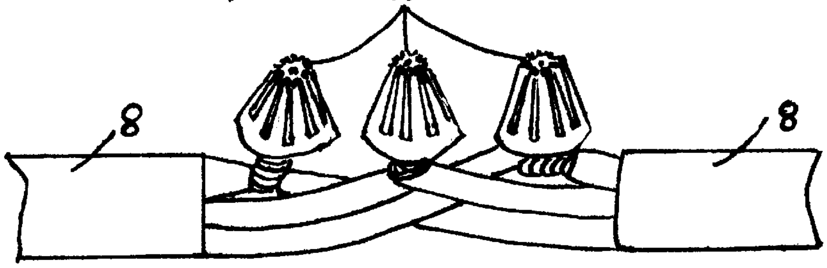
FIG. 5D shows a three wire cable with wire splices, accepting wire nuts. Wire nuts are prior art.

FIG. 5D shows a three wire cable 8, with the wire splices accepting wire nuts 12. Wire nuts are prior art.

Figure 5E:
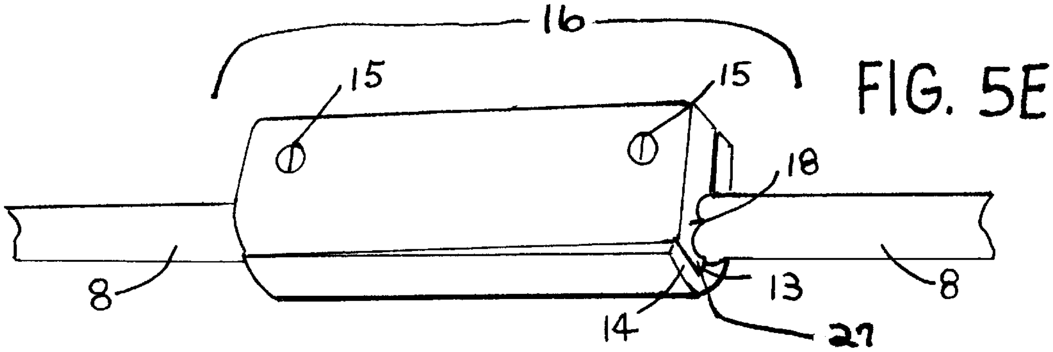
FIG. 5E is the fully assembled three wire enclosure housing.

FIG. 5E is the fully assembled three wire enclosure housing 16 on a cable 8, with wire splices 6 enclosed, showing a curved wedge shaped inner lip 27, a wedge shaped flange 13 to oppose it, and a curved overlapping lip 14 to complete the hinge mechanism of a three wire jaw configuration with voids 18.

The cable to be spliced is opened to free the wires inside the outer cover of a three wire cable 8 (See FIG. 5A). Enough of the outside cable is cut away, approximately three inches, to allow the preparatory cuts on the wire inside the cable to create the wire splices 6 (See FIG. 5C).

One color wire, for example, white 10, is cut short, approximately ⅝ inch beyond the cable cover on one side, where the cable cover is removed from cable 8. The short cut of the white wire 10 completely severs one wire in the cable. Another color wire, such as black 11, is cut short on the other side of the cable, where the outer cover had been removed, also approximately ⅝ inch away from the cover (SEE FIG. 5B).

The third wire, green 9, is cut exactly in half or medium length. The three wires in the cable are now completely severed (SEE FIG. 5*b*). One half of the cable 8 has a long white wire 10, a short black wire 11, and a medium length green wire 9. The other half of the cable 8 has a short white wire 10, a long black wire 11, and a medium length green wire 9. By staggering the cuts of the internal white 10 and black 11 wires, and the green wire 9 cut medium length to be the middle splice; the same color wires line up evenly in a row when spliced together and placed in a three wire enclosure 16 (SEE FIG. 3A).

Approximately ⅜ to ½ inch of the cover of the white 10, black 11, and green wire 9 is stripped off the end of the wire. The copper ends twist into the wire splices 6 (See FIGS. 5B and 5C).

If you are splicing a two wire cable 20, the cuts on the internal wires are long or short; there is no need for a medium length cut on a two wire cable 20, in a two wire enclosure 33 (See FIG. 3B).

On a four wire cable 22, four different length cuts are necessary: long, short, medium long, and medium short. The four lengths allow four colored wires to be staggered and line up in a row, with the same color wire under wire nuts 12, in a four wire enclosure 34 (See FIG. 3C).

Finally, FIG. 5E shows the fully assembled three wire enclosure 16 on a cable 8 with the screws 15 that clamp the enclosure top and bottom mated structures together, 30 and 31, respectively, providing a generally tamper-resistant seal.

Accordingly, the reader will see that the reusable enclosure for wire splices can be used to enclose and reconnect wire splices easily and conveniently. The reusable enclosure can be removed just as easily without damage to the cable, wire splice, or enclosure, and can be reused to splice another cable without requiring a new enclosure.

it provides an enclosure with fewer parts;

it provides an enclosure made of a nonconductive plastic;

it provides a rigid support for wire splices withstanding heavy work stress;

it provides an enclosure with a tight seal for the cable;

it provides an enclosure almost any lay person can apply; and it provides an enclosure that is less labor intensive, less costly, but equally as effective as heretofore known wire splice enclosures.

Although the description above contains many specificities, these should not be construed as limiting the scope of the invention but as merely providing illustrations of some of the presently preferred embodiments of this invention. For example, the enclosure can have other shapes, such as oval, circular, square, etc.; the screws to clamp the two piece housing together can be bolts or reusable connectors, etc. Thus the scope of the invention should be determined by the appended claims and their legal equivalents, rather than by the examples given.

What is claimed is:

1. A reusable enclosure for containing a plurality of spliced junctions in conductors of multi-conductor cable in which each of the spliced junctions is secured within a wire nut, comprising:

a housing defining a generally longitudinal passage therethrough suited for receiving a multi-conductor cable, wherein said housing defines an opening at each opposite end of the passage and a chamber intermediate the opposite ends, suited for containing a plurality of spliced junctions in the conductors of the multi-conductor cable; and wherein said housing defines a plurality of wire nut reception recesses in communication with said intermediate chamber, each recess elongated along an axis extending transversely with respect to the longitudinal dimension of the passage and offset to a side of the passage, whereby each recess is suited to receive a wire nut securing a spliced junction of a conductor in a multi-conductor cable received in the passage of the housing and to retain the received wire nut and spliced junction in a position extending transversely with respect to the generally longitudinal passage through the housing.

2. The reusable enclosure of claim 1, wherein each of said wire nut reception recesses is elongated along an axis extending perpendicularly with respect to the longitudinal dimension of said passage.

3. The reusable enclosure of claim 1, wherein each of said wire nut reception recesses is frusto-conical in contour, oriented with a wide end of the frusto-conical contour proximal to said intermediate chamber and a narrow end of the frusto-conical contour distal to the intermediate chamber, in use for matching engagement with a frusto-conical wire nut on a spliced junction.

4. The reusable enclosure of claim 3, wherein said housing further comprises:

a top mated structure defining at least a first wall portion of said passage and of a first wire nut reception recess; and a bottom mated structure defining at least a second wall portion of the passage and of the first wire nut reception recess;

wherein said top and bottom mated structures are selectively positionable in an open position for, in use, laterally receiving a multi-conductor cable into the passage and laterally receiving a frusto-conical wire nut into the first wire nut recess; and wherein the top and bottom mated structures are selectively positionable in a closed position for, in use, securing the passage about a multi-conductor cable and for securing the first wire nut recess about a wire nut on a spliced junction of a conductor of the multi-conductor cable.

5. The reusable enclosure of claim 4, wherein:

said top mated structure defines at least a first wall portion of a second wire nut reception recess;

said bottom mated structure defines at least a second wall portion of said second wire nut reception recess;

wherein, in use with the top and bottom mated structures in open position, the second wire nut reception recess is laterally open to receive a frusto-conical wire nut into the second wire nut recess; and wherein, in use with the top and bottom mated structures in closed position, the second wire nut recess is laterally secured around a wire nut within the second wire nut recess.

6. The reusable enclosure of claim 1, wherein:

each of said wire nut reception recesses is frusto-conical in contour, oriented with a wide end of the frusto-conical contour proximal to said intermediate chamber and a narrow end of the frusto-conical contour distal to the intermediate chamber for matching engagement with a frusto-conical wire nut on a spliced junction; and said housing defines a plurality of grooves on a wall of a wire nut reception recess, extending between proximal and distal ends of the recess, in use for engaging against a wire nut secured in the recess and preventing movement of a spliced junction secured by the wire nut.

7. The reusable enclosure of claim 1, further comprising:

at least one wire nut having a predetermined surface contour;

wherein at least one of said plurality of wire nut reception recesses comprises a similarly contoured recess to said predetermined surface contour of the wire nut to enable secure engagment between the wire nut and the reception recess.

8. The reusable enclosure of claim 1, wherein said housing further comprises:

a top mated structure defining at least a first wall portion of said passage; and a bottom mated structure defining at least a second wall portion of the passage;

wherein said top and bottom mated structures are selectively positionable in an open position of the housing for, in use, laterally receiving a multi-conductor cable into the passage; and the top and bottom mated structures are selectively positionable in a closed position of the housing for, in use, securing a multi-conductor cable within the passage.

9. The reusable enclosure of claim 8, adapted for use with a multi-conductor cable having a predetermined number of conductors, further comprising:

first and second jaws carried, respectively, on said top and bottom mated structures of said housing, juxtaposed to an end opening of said passage, defining a multi-cusped jaw opening between the jaws when the top and bottom mated structures are in closed position, wherein the multi-cusped jaw opening is defined by arcs between the cusps, and the number of arcs corresponds to said predetermined number of conductors in the multi-conductor cable.

10. The reusable enclosure of claim 9, wherein said multi-cusped jaw opening is of reduced size relative to juxtaposed portions of said passage for, in use, securing a cable within the passage.

11. The reusable enclosure of claim 9, wherein each of said arcs comprises a half circle.

12. A reusable enclosure for containing a plurality of spliced junctions in conductors of multi-conductor cable in which each of the spliced junctions is secured within a wire nut, comprising:

a plurality of wire nuts, each having a predetermined outer surface contour;

a housing defining a generally longitudinal passage therethrough suited for receiving a multi-conductor cable, wherein said housing defines an opening at each opposite end of the passage and a chamber intermediate the opposite ends, wherein the chamber is suitable for containing, in use, a plurality of spliced junctions in the conductors of a multi-conductor cable received in the passage; and wherein said housing defines a plurality of wire nut reception recesses in communication with said intermediate chamber, each recess elongated along an axis extending transversely with respect to the longitudinal dimension of the passage and offset to a side of the passage;

wherein each recess is contoured similarly to a predetermined outer surface contour of said wire nuts, in use for receiving a wire nut securing a spliced junction of a conductor in a multi-conductor cable and for retaining the received wire nut and spliced junction in a position extending transversely with respect to the generally longitudinal passage through the housing.

13. A method of securing a plurality of spliced junctions in conductors of multi-conductor cable, wherein each of the spliced junctions is secured within a wire nut, comprising the following steps:

first, splicing a plurality of conductors of a longitudinally elongated multi-conductor cable at different longitudinal positions such that a plurality of splices is longitudinally spaced along the length of the cable;

second, securing each splice of said plurality of splices within a wire nut;

third, providing a closeable housing having a longitudinal passage defined therethrough and having a plurality of wire nut receiving recesses oriented transversely to the passage, in communication with the passage, and offset to a side of the passage, wherein the number of wire nut receiving recesses is at least equal to the plurality of splices;

fourth, engaging the length of the cable including the splices in a passage through said closeable housing, and engaging each wire nut in one of the wire nut receiving recesses thereof; and fifth, closing the housing.

* * * * *